March 18, 1947.　　　　　G. E. DATH　　　　　2,417,545
SNUBBING MEANS
Filed March 9, 1944
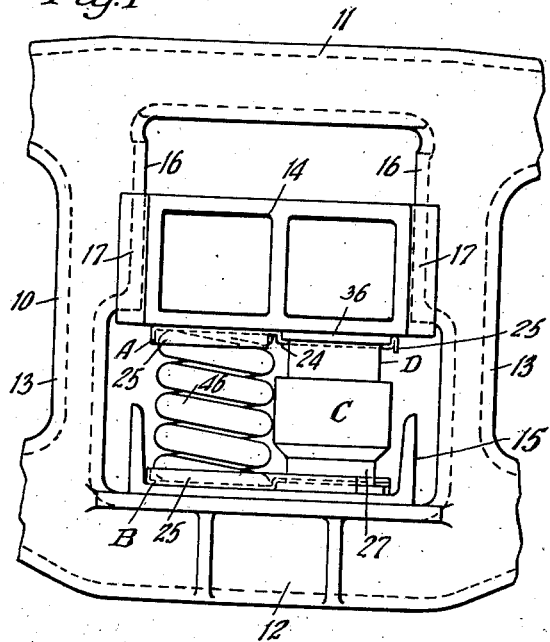
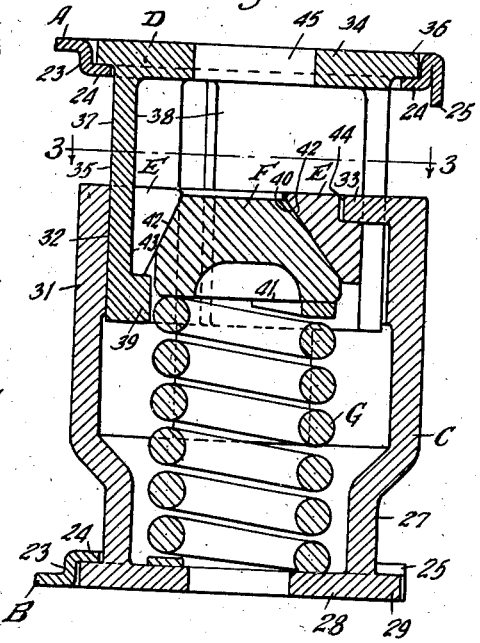
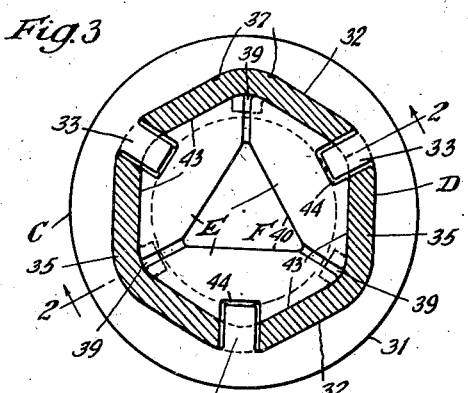
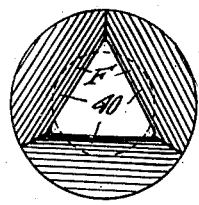
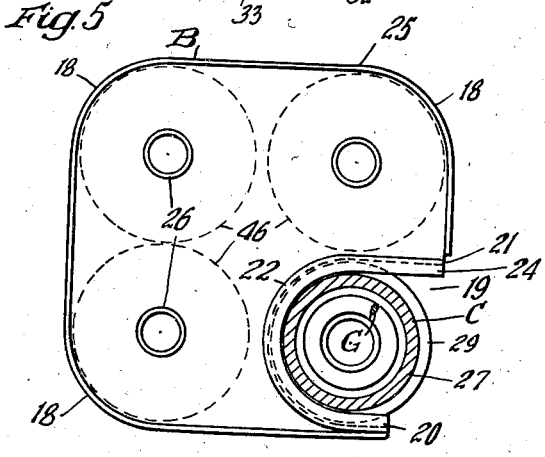
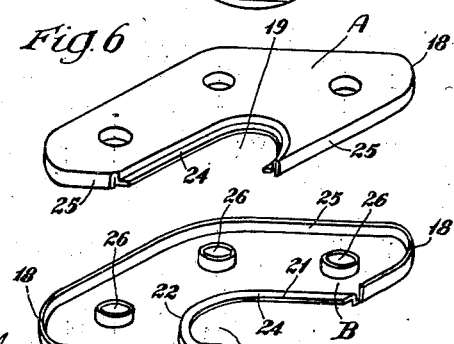
Inventor
George E. Dath
By Henry Fuchs.
Atty.

Patented Mar. 18, 1947

2,417,545

UNITED STATES PATENT OFFICE 2,417,545

SNUBBING MEANS

George E. Dath, Chicago, Ill., assignor to W. H. Miner, Inc., Chicago, Ill., a corporation of Delaware Application March 9, 1944, Serial No. 525,722

6 Claims. (Cl. 267—9)

1

This invention relates to improvements in snubbing means for springs of railway car trucks.

One object of the invention is to provide a truck spring snubbing mechanism comprising relatively movable friction members anchored to the usual spring follower plates of the truck spring cluster of a railway car, whereby the friction elements are operated by relative movement of the spring follower plates to effect the snubbing action.

Another object of the invention is to provide a friction shock absorbing mechanism, which may be substituted for one or more of the spring units of a truck spring cluster to snub or dampen the action of the springs of said cluster, wherein the friction shock absorbing mechanism comprises a friction casing anchored to one of the spring follower plates of the cluster of truck springs for movement with said plate, a friction member having sliding engagement with the interior walls of the casing and anchored to the other spring follower plate of the cluster for movement with said plate, and spring actuated means for pressing the friction member against the interior walls of the casing to provide substantially uniform frictional resistance throughout the compression stroke of the mechanism.

A still further object of the invention is to provide a friction shock absorbing mechanism as set forth in the preceding paragraph, wherein the spring actuated means for pressing the friction member against the walls of the casing comprises a central, pressure transmitting wedge, and friction shoes interposed between the wedge and friction member in wedging engagement with said wedge and having sliding frictional contact with the friction member.

A still further object of the invention is to provide means, on the top and bottom spring follower plates of a railway car truck spring cluster, for anchoring thereto relatively movable friction members adapted to snub or dampen the action of railway car truck springs.

Other objects of the invention will more clearly appear from the description and claims hereinafter following.

In the drawing forming a part of this specification, Figure 1 is a side elevational view of a portion of one of the truck side frames of a railway car, illustrating my improvements in connection therewith. Figure 2 is a transverse vertical sectional view of my improved friction shock absorbing mechanism and cooperating spring follower plates, shown in Figure 1, said view being on an enlarged scale and corresponding substantially to the line 2—2 of Figure 3. Figure 3 is a transverse horizontal sectional view, corresponding substantially to the line 3—3 of Figure 2. Figure 4 is a top plan view of the wedge block employed in my improved mechanism. Figure 5 is a top plan view of the lower spring follower plate illustrated in Figure 1, the lower end portion of the friction shock absorbing mechanism being shown in horizontal section, and the truck springs being indicated in dotted lines. Figure 6 is a perspective view of the top and bottom spring follower plates of my improved mechanism, illustrating the relative positions of said plates with respect to each other.

In said drawing, 10 indicates one of the side frame members of a railway car truck. The side frame 10 is in the form of a casting and has top and bottom members 11 and 12 connected by spaced vertical sections 13—13, forming guides for the truck bolster. As will be understood by those skilled in this art, the truck includes two side frame members 10—10, a truck bolster 14, a spring plank 15, and the usual clusters of truck springs at opposite sides of the truck, in connection with which my improved snubbing means is employed. The opposite ends of the spring plank are supported on the bottom members 12—12 of the truck side frames 10—10 and the opposite ends of the bolster 14 are guided between the sections 13—13 of the truck side frames. As most clearly shown in Figure 1, the sections 13—13 are inwardly offset near the upper ends to provide guides 16—16, which cooperate with seats 17—17 at the sides of the bolster 14. The springs of the spring cluster at each end of the truck rest on the spring plank 15 and support the corresponding end of the bolster 14, thus yieldingly supporting the latter, which, in turn, supports the car body by means of the usual body bolster.

My improved truck spring snubbing means comprises broadly a top spring follower plate A; a bottom spring follower plate B; a friction casing C; a friction plunger D; three friction shoes E—E—E; a wedge block F; and a spring resistance G.

My improvements are illustrated in the drawing as employed with a truck designed for spring clusters, each comprising four spring units.

The top and bottom spring plates A and B are identical. Referring to the spring follower plate B, the same comprises a substantially flat plate section of broadly square outline, having three rounded corners 18. At the front right hand corner portion of the plate B, as seen in Figures 5 and 6, which corresponds to the lower right hand corner portion of the plate, as viewed in Figures 2 and 6, the plate is recessed, as indicated at 19, said recess being open laterally and providing a seat for a purpose hereinafter pointed out. The recess or opening 19 is defined by two laterally spaced, straight, parallel wall portions 20 and 21, and a curved inner wall 22 to which the wall portions 20 and 21 are tangent. The wall 20, which is at the front side of the plate, is shorter than the wall 21, as clearly shown in Figures 5 and 6. At the walls 20, 21, and 22 of the opening 19, the edge portions of the plate are turned up, as indicated at 23, and flanged inwardly, as indicated at 24. The walls of the opening are thus provided with a continuous horizontal flange overhanging the opening, said flange being offset upwardly with respect to the main body portion of the plate.

The spring follower plates A and B are provided with the usual spring centering means, the plate B being provided with an upstanding peripheral flange 25, and three upstanding centering bosses 26—26—26. The flange 25 extends entirely around the plate B except at the opening 19, the same being formed by upturning the peripheral edge of the plate. The centering bosses or projections 26 are located, as illustrated in Figure 5, to cooperate with the three spring units indicated by dotted line circles in said figure.

The spring follower plate A, as hereinbefore stated, is an exact duplicate of the plate B, and the various parts thereof are indicated by corresponding reference characters. The plate A is reversely arranged to the plate B and so positioned that the recess 19 thereof is directly above the recess 19 of the plate B, that is, the plate A is inverted with respect to the plate B and displaced through an angle of 90° so that the recess or opening 19 is located at the front right hand corner thereof and opens toward the front of said plate, as seen in Figures 1 and 6. The flanges 24—24 which overhang the openings 19—19 of the top and bottom plates A and B serve as means for anchoring the friction plunger D and casing C to said plates, as hereinafter pointed out, whereby said plunger and casing are returned to the normal position shown in Figure 1 after each compression of the mechanism.

The friction casing C is in the form of a tubular cylindrical casing having its lower end portion, which is indicated by 27, of reduced transverse cross section. The casing is closed by a horizontal bottom wall 28, which is extended laterally outwardly of the cylindrical side wall of the reduced section 27 of said casing and provides an exterior, horizontally disposed, circular flange 29. The casing is open at the upper end and said open upper end portion thereof is of hexagonal, interior, transverse cross section, as clearly shown in Figure 3, and forms the friction shell proper 31 of the casing. The walls of the casing at the hexagonal friction shell section 31 thereof are preferably thickened and present six longitudinally extending, flat, interior friction surfaces 32. At the mouth of the casing are provided three inwardly projecting retaining lugs 33—33—33 for the friction shoes E—E—E, these lugs being located at alternate corners of the casing.

The base flange 29 of the casing C serves to anchor the casing to the bottom spring follower plate B, the same being disposed within the seat or recess 19 of said plate and engaged underneath the flange 24.

The friction plunger D comprises a follower member 34 and three circumferentially spaced, platelike arms 35—35—35 depending from the follower member. The follower member 34 is in the form of a heavy circular disc, presenting a laterally projecting annular flange 36. The platelike arms 35 are of V-shaped transverse cross section and present longitudinally extending V-shaped friction surfaces 37 and 38 on the outer and inner sides thereof. The platelike arms 35—35—35 of the plunger D are telescoped within the friction shell section 31 of the casing, being alternated with the lugs 33—33—33, each arm having the outer V-shaped friction surface 37 thereof slidingly engaged with two adjacent friction surfaces 32—32 of the casing. As will be evident, the lugs 33—33—33 are accommodated in the spaces between the arms 35—35—35, the opposed side edges of the plates defining guide slots for said lugs. At the lower end of each arm, on the inner side thereof, at the angular corner of the V, an inwardly projecting, horizontal retaining lug 39 is provided for a purpose hereinafter set forth.

The wedge F is in the form of a block having three outwardly converging flat wedge faces 40—40—40 arranged symmetrically about the central vertical axis of the mechanism. The inner end of the wedge block is substantially cylindrical and presents a flat bottom abutment face 41 for the spring G.

The spring G comprises a single coil interposed between the bottom wall 28 of the casing C and the spring abutment face 41 at the lower end of the wedge block F. As will be evident, the wedge block F thus is, in effect, a combined wedge and spring follower.

The friction shoes E, which are three in number, are interposed between the wedge F and the inner sides of the arms 35 of the plunger D. Each shoe E has a flat wedge face 42 on the inner side thereof, engaging with and correspondingly inclined to one of the wedge faces 40 of the wedge. On the outer side each shoe is provided with a pair of longitudinally extending, flat, friction surfaces 43—43, angularly disposed with respect to each other and together forming a face of V-shaped, transverse cross section. Each shoe E overlaps two of the adjacent platelike arms 35—35 of the plunger D, the friction surfaces 43—43 of said shoe respectively engaging the adjacent half portions of the V-shaped inner friction surfaces 38—38 of said arms.

At the angle formed by the meeting edges of the friction surfaces 43—43, the top of each shoe is cut out at the lateral outer side to provide a seat 44 adapted to accommodate the corresponding retaining lug 33 of the casing, the bottom wall of said seat forming a stop shoulder, cooperating with the lug 33 to limit outward movement of the shoe.

As seen in Figure 2, the arms 35—35—35 of the plunger D extend to a point below the shoes E—E—E and have the lug 39 thereof engaged in back of said shoes. As shown in Figure 3, each lug 39 overlaps two of the shoes E—E at adjacent sides of said shoes. As will be evident, outward movement of the shoes E—E—E is limited by the retaining lugs 33 of the casing and outward movement of the plunger D is, in turn, limited by shouldered engagement of the lugs 39 thereof with said shoes.

The disclike follower member 34 is provided with a central opening 45 which serves as an entrance for the shoes E—E—E in assembling the mechanism.

The plunger D has the follower 34 thereof disposed within the recess or seat 19 of the spring follower plate A, with the flange 36 of said follower engaged above the flange 24 of said follower plate, the plunger being thus anchored to the follower plate.

The spring resistance G is under initial compression, thus forcing the wedge F against the shoes, and pressing the shoes into tight frictional contact with the arms 35 of the plunger D, and the arms 35 into tight frictional contact with the casing friction surfaces.

In assembling the friction shock absorbing mechanism, comprising the casing C, plunger D, shoes E, wedge F, and spring G, the procedure is as follows: The spring G and wedge F are first placed within the casing through the open top end thereof, the wedge being seated on the upper end of the spring. The plunger D is then telescoped within the casing and the shoes E—E—E inserted within the plunger D through the opening 45 of the follower 34 thereof. The wedge F is then depressed against the spring G so that the shoes may be placed in position between the wedge faces of the wedge and the interior friction surfaces 38 of the arms 35 of the plunger, with the shoulders formed by the bottom walls of the seats 44 of the shoes engaged underneath the lugs 33 of the casing. After the shoes have been placed in position, the wedge F is released, permitting the spring G to project the same against the wedge faces of the shoes and force the shoes into shouldered engagement with the lugs 33.

As shown in Figure 1, my improved friction shock absorbing mechanism is employed with the usual truck springs to snub the action of these springs, the same being herein illustrated as associated with three spring units of a four spring cluster, being substituted for one of the four units of said cluster. In the drawing, the three spring units with which the friction shock absorbing mechanism is employed are indicated by 46—46—46. Each of these spring units 46 comprises the usual inner and outer coils. The spring units 46—46—46 are interposed between my improved top and bottom spring follower plates A and B which replace the usual follower plates of the spring cluster, and occupy their usual positions. My improved friction shock absorbing mechanism, which replaces the fourth coil, is interposed between the spring follower plates A and B having the follower member 34 of the friction plunger D engaged in the recess 19 of the top follower plate A and bearing on the underneath side of the bolster 14, with the flange 36 of said follower member engaged over the flange 24 of said follower A and in shouldered engagement therewith, and having the bottom end of the casing C seated in the opening 19 of the lower spring follower plate B with the bottom wall 28 of said casing seated on the spring plank and the flange 29 engaged underneath the flange 24 of said follower plate B.

The operation of my improved truck spring snubbing means is as follows: Upon relative approach of the truck bolster 14 and the spring plank 15, the truck springs 46 are compressed between the spring follower plates A and B, and the friction plunger D and the friction casing C are forced to move lengthwise toward each other, the platelike friction arms 35 of the plunger sliding inwardly of the casing between the friction surfaces 43 of the shoes and the friction surfaces 32 of the casing. Inasmuch as the spring G yieldingly forces the wedge F against the shoes, tending to spread the same apart, the friction plate arms 35 of the plunger D are squeezed between the friction surfaces of the shoes and casing, producing the required frictional resistance to snub the action of the truck springs. Upon recoil of the truck springs 46, the follower plates A and B are forced apart, and, the friction plunger D and friction casing C being anchored thereto respectively, are moved lengthwise apart, pulling the plunger outwardly of the casing and restoring the parts to the normal release position shown in Figures 1 and 2, outward movement of the plunger being arrested by shouldered engagement with the shoes which, in turn, shoulder against the stop lugs 33 of the casing.

Inasmuch as the spring G is at all times under compression and forces the wedge against the friction shoes, the frictional resistance of my improved shock absorber is constant throughout operation of the device, thus also providing the required frictional resistance to snub the action of the truck spring during recoil of the latter.

I claim:

1. In a shock absorber, the combination with spring follower plates movable toward and away from each other, each follower plate having a laterally outwardly opening recess partly surrounded by an inwardly projecting flange; of a plurality of springs interposed between said plates, said springs being compressible between said follower plates; a friction casing seated at its outer end in the recess of one of said follower plates; a friction member slidably telescoped within said casing and having its outer end seated in the recess of the other follower plate; laterally outwardly projecting retaining flanges on the outer ends of said member and casing respectively engaged in back of the flanges of said follower plates to anchor said member and casing to said follower plates for outward movement therewith; and means pressing said friction member and casing into tight frictional engagement with each other.

2. In a shock absorber, the combination with spring follower plates relatively movable toward and away from each other; of a plurality of springs interposed between said follower plates, said springs being compressible therebetween; a friction casing having a flange at the outer end anchored to one of said followers; a friction plunger having friction arms telescoped within said casing in sliding frictional engagement therewith, said plunger having a flange at its outer end anchored to the other follower; a spring follower block within the casing; friction shoes interposed between said block and arms of the plunger, said shoes having sliding frictional engagement with said arms, and wedging engagement with said block; and spring means within said casing forcing said block against the shoes.

3. In a shock absorber, the combination with a friction casing open at one end and having interior friction surfaces at said open end; of a combined spring follower and wedge block within the casing; a spring within said casing pressing said wedge block outwardly; friction shoes surrounding said block and having wedging engagement therewith; and a plunger having friction arms telescoped within the casing between the friction shoes and the friction surfaces of the casing and having sliding frictional engagement with said shoes and said casing friction surfaces.

4. In a shock absorber, the combination with a friction casing open at one end and having interior friction surfaces at said open end; of a combined spring follower and wedge block within the casing; a spring within said casing pressing said wedge block outwardly; friction shoes surrounding said block and having wedging engagement therewith; stop lugs on said casing limiting outward movement of the shoes; and a plunger having friction arms telescoped within the casing between the friction shoes and the friction surfaces of the casing and having sliding frictional engagement with said shoes and said casing friction surfaces, said arms having lugs engageable with said shoes to limit outward movement of said plunger.

5. In a shock absorber, the combination with a friction casing having a friction shell section at one end thereof of hexagonal interior cross section; of a combined spring follower and wedge block having outwardly converging wedge faces; a spring within the casing pressing said block outwardly; friction shoes surrounding said block, each shoe having a wedge face on the inner side in wedging engagement with one of the wedge faces of said block, each shoe having a longitudinally extending V-shaped friction surface on the outer side thereof; and a friction plunger having platelike friction arms interposed between the shoes and interior walls of the friction shell section and having longitudinally extending friction surfaces on the inner and outer sides thereof engaged respectively with the V-shaped friction surfaces of the shoes and the interior walls of the friction shell section of the casing.

6. A spring follower plate comprising a flat plate of substantially square outline having rounded corners, said plate being cut out at one corner to provide an outwardly opening recess defined by side walls and an end wall, a horizontal flange on said plate projecting from the walls of said recess and overhanging said recess, a right angular peripheral flange on said plate extending entirely around said plate, except at the outwardly opening part of said recess, and a plurality of spring centering bosses on said plate.

GEORGE E. DATH.

REFERENCES CITED

The following references are of record in the file of this patent:

UNITED STATES PATENTS

| Number | Name | Date |
|---|---|---|
| 1,169,862 | Peycke | Feb. 1, 1916 |
| 1,169,863 | Peycke | Feb. 1, 1916 |
| 1,707,490 | O'Connor | Apr. 2, 1929 |
| 2,084,637 | Goodwin | June 22, 1937 |
| 2,118,006 | Couch | May 17, 1938 |
| 2,360,262 | Gelkers | Oct. 10, 1944 |
| 638,498 | Davis | Dec. 5, 1899 |
| 1,741,650 | O'Connor | Dec. 31, 1929 |
| 531,910 | Cloud | Jan. 1, 1895 |